United States Patent [19]
Lau et al.

[11] Patent Number: 5,774,465
[45] Date of Patent: Jun. 30, 1998

[54] METHOD AND APPARATUS FOR PROVIDING MULTIPLE MULTICAST COMMUNICATION SESSIONS IN AN ATM DESTINATION SWITCH

[75] Inventors: Joseph C. Lau, Shelton; Subhash C. Roy, Hamden, both of Conn.

[73] Assignee: Transwitch Corp., Shelton, Conn.

[21] Appl. No.: 650,910

[22] Filed: May 17, 1996

[51] Int. Cl.[6] .................................................. H04Q 11/04
[52] U.S. Cl. ......................... 370/397; 370/356; 370/359; 370/395
[58] Field of Search .................................... 370/397, 395, 370/416, 352, 399, 392, 356, 359, 419

[56] References Cited

U.S. PATENT DOCUMENTS

| | | | |
|---|---|---|---|
| 5,130,975 | 7/1992 | Akata | 370/416 |
| 5,530,806 | 6/1996 | Condon et al. | 370/397 |
| 5,550,821 | 8/1996 | Akiyoshi | 370/397 |
| 5,555,244 | 9/1996 | Gupta et al. | 370/397 |
| 5,636,210 | 6/1997 | Agrawal | 370/395 |

*Primary Examiner*—Douglas W. Olms
*Assistant Examiner*—Shick Hom

*Attorney, Agent, or Firm*—David P. Gordon; David S. Jacobson; Thomas A. Gallagher

[57] ABSTRACT

An ATM destination switch includes an ATM layer device coupled to a physical layer device. The ATM layer device includes a ATM layer interface which receives incoming ATM cells, a processor which is typically with an associated translation RAM, and an ATM layer to physical layer interface. The processor decodes the incoming ATM cell to obtain a VPI/VCI, and provides additional routing information (session number) for the cell for multicast purposes. The cell with the additional routing information is forwarded to the physical layer device which has a header processor, a multicast indicator storage table, preferably in the form of a bit map, for storing output line indications by session number, and a plurality of ATM line output interfaces. The header processor receives the cell with the additional routing information, reads the additional routing information, accesses the multicast indicator storage table based on the additional routing information to determine to which output lines the cell is to be provided, and controls the copying of the cell for each output line so that it may be received at multiple destinations. Thus, an incoming cell which is to be multicast to multiple users connected to the physical layer side of the switch will be multicast to the multiple users using the single VPI/VCI chosen for the local multicast.

20 Claims, 3 Drawing Sheets

METHOD AND APPARATUS FOR PROVIDING MULTIPLE MULTICAST COMMUNICATION SESSIONS IN AN ATM DESTINATION SWITCH

BACKGROUND OF THE INVENTION

1. Field of the Invention

The present invention relates broadly to telecommunications. More particularly, the present invention relates to an ATM destination switch having multicast capabilities. For purposes herein, the term "destination switch" is to be understood in its broadest sense to include any call-terminating switch, access switch, router, or multiplexer located at the ATM-network/user-line interface.

2. State of the Art

In an ATM network, it is often desirable to effect a multicast of ATM cells; i.e., to transport ATM cells from a source terminal to a plurality of different destinations. Each of the destinations of the multicast will typically have its own address. Thus, it is necessary to duplicate the ATM cells, provide different headers for each of the cells, and send the cells out on different virtual circuits (VCs). In multicast situations, it is possible that some of the multiple destinations are connected to a single destination switch (e.g., several destinations may be coupled to a single local area network (LAN)). In such situations, it is desirable to reduce the transport load on the network by sending only a single copy of each multicast cell to that destination switch element, and to inform the receiving destination switch element of its responsibility to send the cell to each of the multiple destinations which are coupled to it. It has been proposed in the art that the destination switch element would accomplish the multicasting of the cell to the multiple destinations in the standard manner of providing the received cell with unique VCIs for each of the multiple destinations.

The advantages of transporting a single cell across a network and then multicasting the cell to a plurality of destinations coupled to a destination switch element are that the network bandwidth usage is reduced, and the cell delay variation is likewise reduced. On the other hand, if the destination switch element must multicast an incoming cell to multiple destinations, the switch element must conduct several VC address translations. As will be appreciated by those skilled in the art, a VC address translation requires either a large amount of logic and memory to enable a hashing function, or a large content addressable memory. In addition, where multiple multicast sessions must be supported, the processing power and memory requirements can grow very large.

SUMMARY OF THE INVENTION

It is therefore an object of the invention to provide an apparatus and method for supporting multiple ATM multicast sessions in an ATM switch without requiring multiple address translations.

It is another object of the invention to provide an ATM destination switch which can multicast a received ATM cell to a plurality of destinations without requiring large amounts of memory for address translations.

In accord with the objects of the invention an ATM destination switch is provided and includes at least one ATM layer device coupled to at least one physical layer device. The ATM layer device includes a ATM layer interface which receives incoming ATM cells, a processor (typically with an associated translation RAM), and an ATM layer to physical layer interface. The processor acts as a decoder means for decoding the incoming ATM cell to obtain a VPI/VCI and a PTI, and as an index means for providing additional routing information (session number) for the cell for multicast purposes; the additional routing information typically being stored in the translation RAM. After the cell is provided with the additional routing information, it is forwarded via the ATM layer to physical layer interface to the physical layer device.

The physical layer device of the destination switch includes a physical layer to ATM layer interface, a header processor, a multicast indicator storage means for storing output line indications by session number, and a plurality of ATM line output interfaces. The header processor receives the cell with the additional routing information, reads the additional routing information, accesses the multicast indicator storage means based, on the additional routing information to determine to which output lines the cell is to be provided, and controls the copying of the cell (without the additional routing information) for each output line so that it may be received at multiple destinations. With the provided ATM destination switch, an incoming cell which is to be multicast to multiple users connected to the physical layer side of the switch will be multicast to the multiple users using the single VPI/VCI chosen for the local multicast. However, during call set-up, the switch will have already informed each of the multiple destinations that a cell having that particular VPI/VCI is destined for them. Thus, upon seeing an ATM cell having the particular VPI/VCI, each of the multiple users (whether on separate lines or on a LAN) will receive the ATM cell.

According to a preferred aspect of the invention, the additional routing information provided for the cell to be multicast is provided as an additional cell header "tag" byte to the standard fifty-three byte ATM cell. For example, all eight bits of the tag byte of the now fifty-four byte ATM cell will enable the destination switch to support two hundred fifty-six local multicast sessions. Of course, fewer or more bits or bytes can be used to support fewer or more multicast sessions. Alternatively, the additional routing information may be inserted in the ATM header in lieu of other ATM header information.

According to another preferred aspect of the invention, the multicast indicator storage means is an N×M sized RAM, where N is the number of supported multicast sessions (e.g., two hundred fifty-six), and M is the number of destination switch output lines. With this arrangement, each word of M bits is a binary bit map where the bit location is associated with a specific output line (terminal). A "1" in the bit location is used to indicate that the associated output line should receive the cell, whereas a "0" indicates that the cell need not be copied for that output.

It is noted that the processor of the ATM layer device of the destination switch can also act as a translation means for translating one VPI/VCI to another VPI/VCI (using the translation RAM). In the preferred embodiment of the invention where the destination switch is connected to an ATM backplane bus which is coupled to the ATM network via another ATM device and not directly connected to the ATM network, a VPI/VCI translation is carried out by the other device, and the processor need only provide the additional routing information. However, in other embodiments, where the destination switch is directly connected to the ATM network, or is coupled to the ATM network via devices which do not conduct a VPI/VCI translation, the processor preferably translates an incoming VPI/VCI into a destination VPI/VCI as well as adding the additional routing information.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
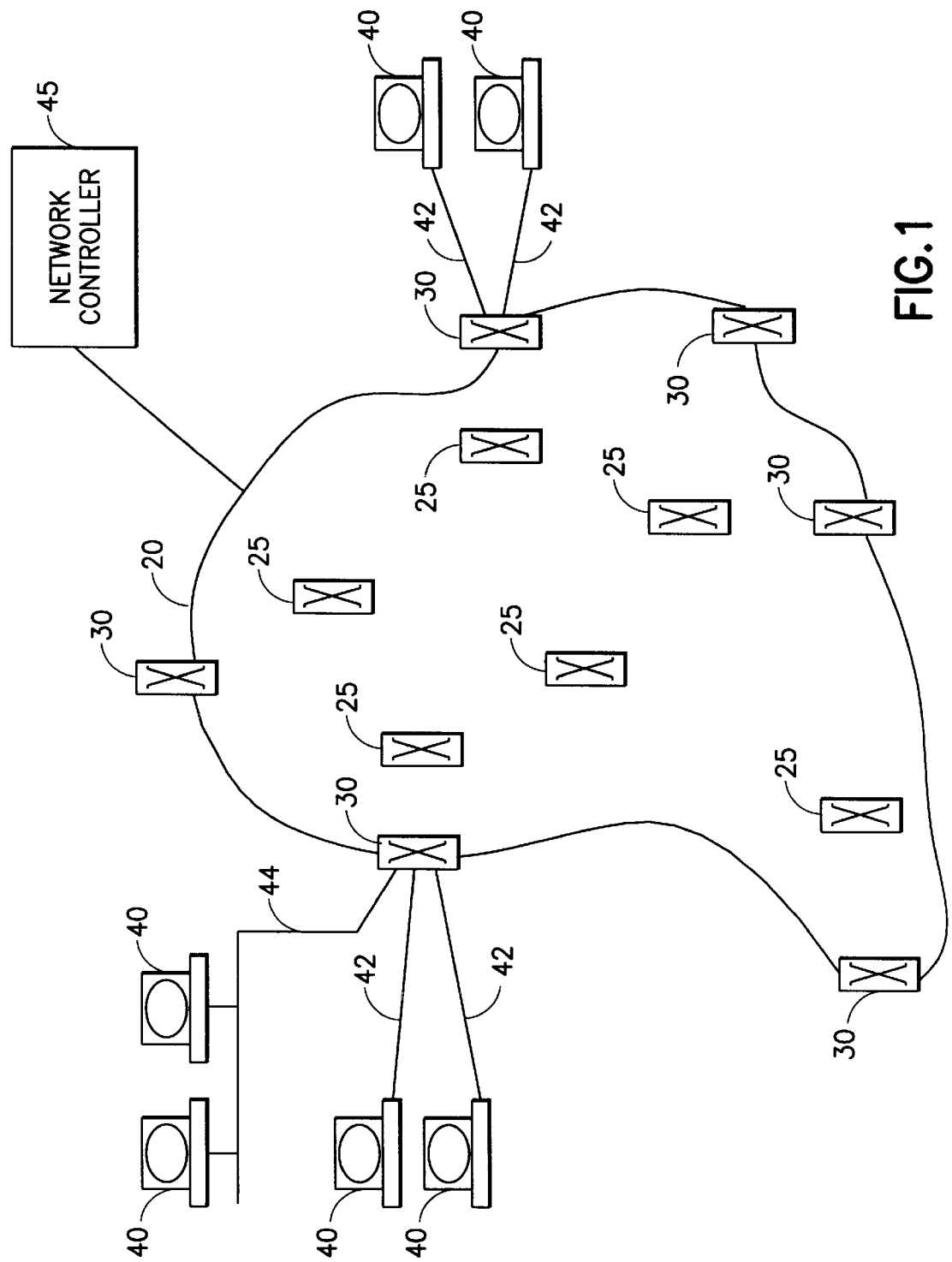
FIG. 1 is a diagram of an ATM network, including a plurality of destination switches and terminals.

A typical ATM network 10 as shown in FIG. 1, includes a network cloud 20 having a plurality of ATM switches 25, a plurality of destination switches 30, and a plurality of ATM terminals 40 which are coupled to the destination switches. Some of the ATM terminals are shown having direct line connections 42 to the destination switches 30. Others of the ATM terminals are shown coupled via a LAN 44 to the destination switches 30. An ATM network controller 45 is provided for configuring the ATM switches 25, 30, and for managing the network. Thus, the network controller 45 typically provides each of the switches with translation tables and other information which permits ATM calls to be set up and to proceed. Those skilled in the art will appreciate that many different network configurations are known in the art; and FIG. 1 is a high level diagram provided by way of example for background purposes only.

One of the well known functions of an ATM switch is its capability of carrying out a multicast function; i.e., making multiple copies of an ATM cell for delivery to multiple destinations. As discussed above, recently there have been proposals to provide destination switches with multicast capabilities so that in a multicast situation, a single cell can be sent to a destination switch having a plurality of terminals coupled to it which are to receive the cell. In the prior art proposals, the destination switch element must conduct several VC address translations to locally multicast the cell to the different terminals.

Figure 2:
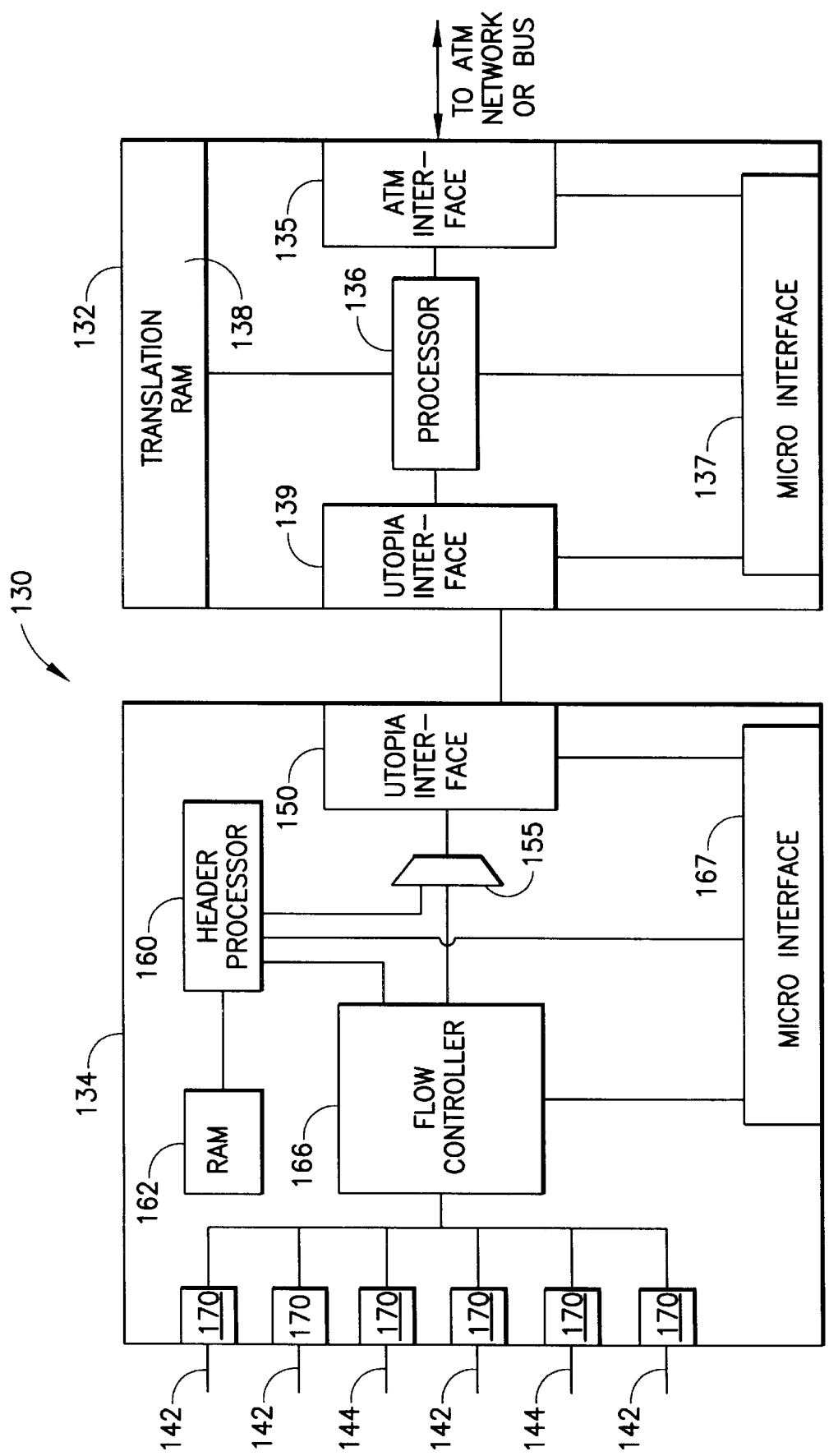
FIG. 2 is high level block diagram of a destination switch according to the invention.
Figure 3:
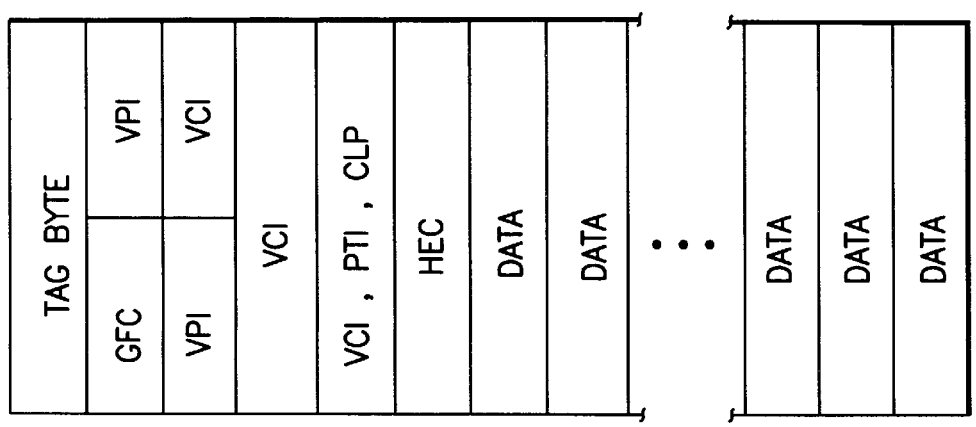
FIG. 3 is a diagram of a modified ATM cell including the multicast session tag byte according to a preferred embodiment of the invention.

As seen in FIG. 2, and in accord with the invention, an ATM destination switch 130 (which can be used in the network of FIG. 1 in lieu of switch 30) is provided which can locally multicast ATM cells without conducting multiple VC address translations. In particular, the ATM destination switch 130 typically includes an ATM layer VLSI chip 132 and a physical layer VLSI chip 134. The ATM layer chip, which is preferably a chip sold under the tradename CUBIT (part #TXC-05801) by the assignee hereof TranSwitch Corporation of Shelton, Conn., typically includes an ATM interface 135, a processor 136, a microprocessor interface 137 and a UTOPIA interface 139. A translation RAM 138 is preferably associated with the ATM layer chip 132. The ATM network interface 135 (e.g., an eight bit UTOPIA standard type interface) receives incoming ATM cells and forwards them to the processor 136. The processor 136 acts as a decoder means for decoding the incoming ATM cell, among other things, to obtain a VPI/VCI, and as a multicast session number assignment means for providing additional routing information (i.e., a session number) based on the VPI/VCI for the cell in order to permit the cell to be multicast. In particular, upon decoding the VPI/VCI, the processor (based on set-up information previously provided by network controller 45) determines whether the incoming cell is to be directed locally or switched for output to the network. If the cell is to be directed locally, the processor provides the ATM cell with additional routing information which is preferably stored in the VPI/VCI translation table. As discussed hereinafter in more detail with reference to FIG. 3, the additional routing information is an index to a multicast indicator RAM table located in the physical layer chip 134, and may take the form of bits in an additional byte or bytes added to the cell header, or may take the form of one or more bits of the existing five byte cell header.

It should be appreciated by those skilled in the art that in certain embodiments of the invention, the processor 136 can also act as a translation means for translating an incoming VPI/VCI to a destination VPI/VCI (based on the translation table in the translation table RAM 138). This capability is provided in the CUBIT chip and is important for embodiments where the ATM layer chip is connected directly to the ATM network, or is coupled to the ATM network via a device or devices (not shown) which do not conduct a VPI/VCI translation. However, in the preferred embodiment of the invention, the CUBIT ATM layer chip is connected to a CELLBUS (a trademark of the assignee hereof TranSwitch Corporation) system (not shown) which includes additional CUBIT chips and a backplane-type bus coupling the CUBIT chips and which transports ATM bytes according to a frame disclosed in co-owned U.S. patent applications Ser. Nos. 08/123,881 and 08/213,398 which are hereby incorporated by reference herein in their entireties. In the CELLBUS system, incoming ATM bytes undergo a VPI/VCI translation at the receiving CUBIT chip, and the ATM bytes are then placed on the backplane-type bus for the destination switch of this invention. Thus, upon the ATM layer chip 132 receiving the ATM cell from the bus, the ATM cell already has a destination VPI/VCI, and no further translation is required. However, as discussed above, additional routing information for that destination VPI/VCI is provided by the ATM layer chip 132 by the processor 136 (and utilizing the translation RAM 138) in order to help effect a multicasting of the ATM cell as discussed in more detail below.

The physical layer chip 134 of the destination switch includes a UTOPIA interface 150, a demultiplexer 155, a header processor 160, a multicast indicator RAM 162, a flow controller 166, and a plurality of ATM line interfaces 170 which are coupled to ATM lines 142 and LANs 144. Additionally shown is a microprocessor interface 167. After an ATM cell is provided with the additional routing information to the UTOPIA interface 150 by the ATM layer chip 132, it is demultiplexed by the demultiplexer 155 to provide the header processor 160 with the additional routing information contained in the cell. Based on the session index number contained in the additional routing information, the header processor 160 accesses a corresponding location in the multicast indicator RAM 162 (the details of which are discussed hereinafter with reference to FIG. 4). Using the data contained in the multicast indicator RAM 162, the header processor 160 directs the flow controller 166 to provide copies of the cell (preferably without the additional routing information) to each (one or more) interface 170 to which the cell is destined. In this manner, where the cell is being multicast, the identical cell (i.e., with the same VPI/VCI) is provided to the interfaces of multiple output lines, and may be buffered or otherwise processed as necessary for output. During call set-up (in accordance with known call set-up procedures which are not of primary interest for this invention, the switch 130 will have already informed each of the multiple destinations that a cell having that particular VPI/VCI is destined for them. Thus, upon seeing an ATM cell having the particular VPI/VCI, each of the multiple users (whether on separate lines or on a LAN) will receive the ATM cell.

The additional routing information is provided for all cells which are to be terminated. According to a preferred aspect of the invention, and as seen with reference to FIG. 3, the additional routing information is provided as an additional cell header "tag" byte to the standard fifty-three byte ATM cell. For example, all eight bits of the tag byte of the now fifty-four byte ATM cell will enable the destination switch to support two hundred fifty-six local multicast sessions. Of course, fewer or more bits or bytes can be used to support fewer or more multicast sessions.

In accord with another embodiment of the invention, the additional routing information is provided in the header of the ATM cell. For example, the header error correction (HEC) byte of the ATM cell, instead of being used for header error correction may be used for the additional routing information. Thus, the ATM cell would continue to include forty-eight bytes of data and five bytes of overhead. Similarly, if one or more of the VPI, VCI, and PTI were to be shortened (typically the VCI), the additional routing information could be inserted in one or more of those fields.

Figure 4:
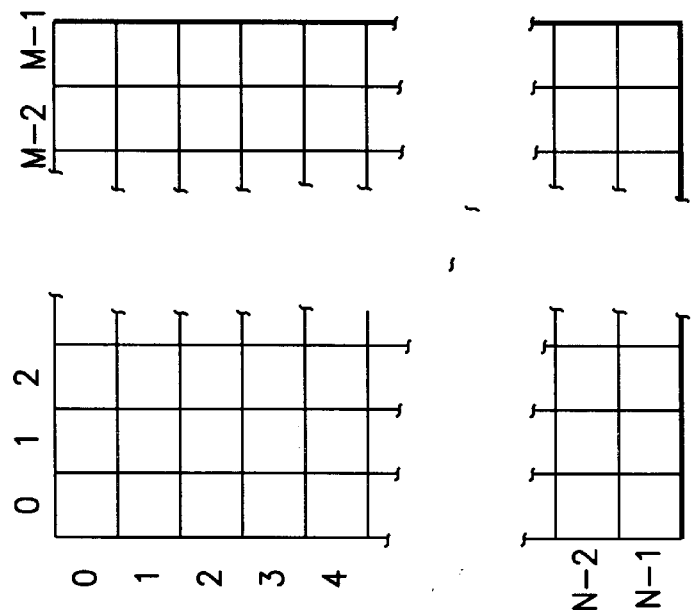
FIG. 4 is a more detailed diagram of the multicast indicator RAM of FIG. 2.

According to another preferred aspect of the invention, and as seen in FIG. 4, the multicast indicator RAM 194 is an N×M sized RAM, where N is the number of supported multicast sessions (e.g., two hundred fifty-six), and M is the number of destination switch output lines. With this arrangement, each of the N words preferably assumes a position in the RAM associated with a session number. For example, the first word (0) is used to correspond to session #0, while the second word (1) corresponds to session #1. With N words, it will be appreciated that N multicast communications can be simultaneously supported in the switch of the invention. Within a word, the M bits of the word are used as a binary bit map where the bit location is associated with a specific output line (terminal). A "1" in the bit location is used to indicate that the associated output line should receive the cell, whereas a "0" indicates that the cell need not be copied for that output. For unicast cells, only a single "1" will appear in the word of M bits, whereas for a multicast cell, a plurality of "1" values will appear in the word of M bits.

It will be appreciated that the method of the invention is closely related to the switch of the invention, and generally includes: obtaining an incoming ATM cell, adding additional routing information to the ATM cell, providing a table which stores a multicast indicator, using the additional routing information as an index to the table, and using the information at the indexed location in the table to determine to which output interfaces to provide the ATM cell.

There have been disclosed herein an apparatus and method for providing multicast communication sessions in an ATM destination switch. While preferred embodiments of the invention have been described, it is not intended that the invention be limited thereto, as it is intended that the invention be as broad in scope as the art will allow and that the specifications be read likewise. Thus, while the invention has been described as being implemented in two VLSI chips (an ATM layer chip and a physical layer chip), it will be appreciated that different numbers of chips could be utilized. Also, while the ATM layer chip was described as having a single ATM network interface, it will be appreciated that multiple network interfaces could be provided. Additionally, while the destination switch of the invention was not shown as including a switch fabric, it will be appreciated that the ATM layer chip could include or could be connected to a switch fabric. Furthermore, while the invention was described with reference to standard ATM cells with a data payload of forty-eight bytes and a header of five bytes, it will be appreciated that the invention has application to any telecommunications destination switch which is receiving cells having a header and a data payload, regardless of the size of the header and payload, and regardless of whether a single header is used for a plurality of payloads such as for packet-type communications.

Those skilled in the art will further appreciate that while the invention was described as including a translation RAM in the ATM layer chip, within the scope of the invention, for incoming ATM traffic, it is not mandatory to conduct an incoming to outgoing VPI/VCI translation; i.e., the incoming VPI/VCI can be utilized as the VPI/VCI which is sent on the destination lines or LANs to the terminals, or as previously disclosed, the VPI/VCI translation could have been already carried out in another apparatus. Furthermore, while the additional routing information (session number) was described as being provided by the processor of the ATM layer chip based on the incoming VPI/VCI, it will be appreciated that the session number could be keyed to the outgoing (translated) VPI/VCI; particularly where the VPI/VCI has already been translated before being received by the processor. Further yet, it will be appreciated that while the physical layer chip was described as having a "header processor" block, a UTOPIA interface block, a "flow controller" block, a demultiplexer block, etc., these designations are for purposes of convenience only. Thus, some or all of the blocks can be subsumed under blocks of different designation such as "processor", provided certain functions are provided: receiving the cell with the additional routing information, using the routing information to access a multicast indicator memory location, and forwarding the cell to all line outputs indicated by the multicast indicator memory location. Similarly, it should be appreciated that some of the blocks described, such as the multicast indicator RAM, can be located off-chip. It will also be appreciated by those skilled in the art, that while the additional routing information is preferably stripped from the ATM cell before it is multicast, the additional routing information can be maintained in the cell being sent to the terminal equipment. In such a case, the terminal equipment should be informed of the content format of the cells being transmitted so that the additional routing information will not be misinterpreted as data or other header information. It will therefore be appreciated by those skilled in the art that yet other modifications could be made to the provided invention without deviating from its spirit and scope as so claimed.

We claim:

1. A telecommunications destination switch, comprising:
   a) at least one telecommunications network interface means for receiving an incoming telecommunications cell having a data portion and a header portion having a VPI/VCI;
   b) decoder means for decoding said incoming telecommunications cell to obtain said VPI/VCI of said incoming telecommunications cell;
   c) index means for providing said incoming telecommunications cell with additional routing information based on information related to said VPI/VCI;
   d) multicast indicator storage means for storing a plurality of output channel indications, said multicast indicator storage means being indexed by said additional routing information;

e) a plurality of line interfaces; and f) means for providing copies of said data portion of said incoming telecommunications cell with identical header portions to at least one of said plurality of line interfaces based on an indexed one of said plurality of output channel indications.

2. The telecommunications destination switch according to claim 1, wherein:

said incoming telecommunications cell is an ATM cell, and said at least one telecommunications network interface means comprises at least one ATM network interface means.

3. The telecommunications destination switch according to claim 2, wherein:

said ATM cell includes a destination VPI/VCI, and said information related to said VPI/VCI is said destination VPI/VCI.

4. The telecommunications destination switch according to claim 2, further comprising:

g) a VPI/VCI translation table; and h) translation means for translating said incoming VPI/VCI to a destination VPI/VCI utilizing said VPI/VCI translation table, wherein said means for providing copies of said data portion of said ATM cell with identical header portions to at least one of said plurality of line interfaces provides said outgoing VPI/VCI in said identical header portions, and said information related to said VPI/VCI constitutes one of said incoming VPI/VCI and said destination VPI/VCI.

5. The telecommunications destination switch according to claim 4, wherein:

said identical header portions do not include said additional routing information.

6. The telecommunications destination switch according to claim 1, wherein:

said multicast indicator storage means is a RAM including at least N words, where N is an integer and represents a number of simultaneous multicast sessions supported by said telecommunications destination switch, and said N words include at least M bits, where M is at least as large as the number of said plurality of line interfaces of said telecommunications destination switch.

7. The telecommunications destination switch according to claim 6, wherein:

said incoming telecommunications cell is an ATM cell, and said additional routing information comprises a plurality of bits in said header portion of said ATM cell, said plurality of bits indexing one of said N words of said multicast indicator storage means.

8. The telecommunications destination switch according to claim 7, wherein:

said index means for providing said ATM cell with additional routing information provides said additional routing information in a sixth header byte of said ATM cell.

9. The telecommunications destination switch according to claim 7, wherein:

said additional routing information is provided in a HEC header byte of said ATM cell.

10. The telecommunications destination switch according to claim 6, wherein:

each of said plurality of output channel indications is a binary bit map of said plurality of line interfaces.

11. The telecommunications destination switch according to claim 2, wherein:

said at least one telecommunications network interface means, said decoder means, and said index means are located on a first VLSI chip, and said multicast indicator storage means, said plurality of line interfaces, and said means for providing copies are provided on a second VLSI chip coupled to said first VLSI chip.

12. The telecommunications destination switch according to claim 2, wherein:

said at least one telecommunications network interface means comprises at least one interface to a backplane bus carrying ATM cells.

13. A method for multicasting an ATM cell at an ATM destination switch having a plurality of line interfaces, comprising:

at the destination switch, a) obtaining said ATM cell;

b) based on information related to said ATM cell, providing additional routing information for said ATM cell;

c) providing a table which stores multicast indicator information;

d) using the additional routing information as an index to the table; and e) using the information at the indexed location in the table to determine to which of the line interfaces to provide the ATM cell.

14. The method according to claim 13, wherein:

said table is provided as a binary bit map of said plurality of line interfaces with a first bit value at a first location in said binary bit map indicating that the ATM cell is to be provided to a particular line interface, and a second bit value at said first location in said binary bit map indicating that the ATM cell is not to be provided to said particular line interface.

15. The method according to claim 13, wherein:

said information related to said incoming ATM cell is a VPI/VCI of a header of said incoming ATM cell.

16. The method according to claim 15, wherein:

said VPI/VCI is a destination VPI/VCI.

17. The method according to claim 15, further comprising:

translating a VPI/VCI of a header of said incoming ATM cell to a destination VPI/VCI, wherein said information related to said incoming ATM cell is one of said VPI/VCI of said header of said incoming ATM cell and said destination VPI/VCI.

18. The method according to claim 13, wherein:

said providing additional routing information for said ATM cell comprises providing at least one additional byte to a header of said ATM cell, said at least one additional byte including said additional routing information.

19. The method according to claim 13, wherein:

said providing additional routing information for said ATM cell comprises inserting said additional routing information in a HEC byte of said ATM cell.

20. The telecommunications destination switch according to claim 1, wherein:

said means for providing copies comprises a flow controller which regenerates copies of the data portion of the incoming telecommunications cell.

* * * * *